(12) United States Patent
Ross et al.

(10) Patent No.: US 7,258,517 B2
(45) Date of Patent: Aug. 21, 2007

(54) SELF-PUNCHING FASTENER WITH RADIALLY POSITIONED PROJECTIONS AND AN ANNULAR DEPRESSION

(75) Inventors: Gerold Ross, Bendorf (DE); Detlef Ludwig, Niederstetten (DE)

(73) Assignee: Textron Verbindungstechnik GmbH & Co. OHG (DE)

( * ) Notice: Subject to any disclaimer, the term of this patent is extended or adjusted under 35 U.S.C. 154(b) by 0 days.

(21) Appl. No.: 10/487,495

(22) PCT Filed: Aug. 22, 2002

(86) PCT No.: PCT/DE02/03077

§ 371 (c)(1),
(2), (4) Date: Jul. 8, 2004

(87) PCT Pub. No.: WO03/019019

PCT Pub. Date: Mar. 6, 2003

(65) Prior Publication Data

US 2004/0247380 A1  Dec. 9, 2004

(30) Foreign Application Priority Data

Aug. 22, 2001  (DE) ................ 201 13 853 U

(51) Int. Cl.
*F16B 37/04*  (2006.01)
(52) U.S. Cl. ..................... 411/180; 411/188
(58) Field of Classification Search ........ 411/178–181, 411/187, 188
See application file for complete search history.

(56) References Cited

U.S. PATENT DOCUMENTS

| | | | | |
|---|---|---|---|---|
| 1,332,686 A | * | 3/1920 | Reynolds ............... | 285/202 |
| 3,213,914 A | * | 10/1965 | Beumle et al. ........... | 411/179 |
| 3,253,631 A | * | 5/1966 | Reusser .................. | 411/179 |
| 3,282,315 A | * | 11/1966 | Tania ..................... | 411/179 |
| 3,648,747 A | * | 3/1972 | Steward .................. | 411/179 |
| 3,810,291 A | * | 5/1974 | Ladouceur ............... | 29/243.517 |
| 5,340,251 A | * | 8/1994 | Takahashi et al. ........ | 411/179 |
| 5,531,552 A | * | 7/1996 | Takahashi et al. ........ | 411/179 |
| 5,549,430 A | | 8/1996 | Takahashi et al. | |
| 5,882,159 A | * | 3/1999 | Muller .................. | 411/179 |
| 6,220,804 B1 | | 4/2001 | Pamer et al. | |
| D450,235 S | * | 11/2001 | Shinjo et al. ............ | D8/397 |
| 6,732,431 B2 | * | 5/2004 | Muller .................. | 29/874 |
| 6,851,904 B2 | * | 2/2005 | Parker et al. ............ | 411/180 |
| 6,994,500 B2 | * | 2/2006 | Ward et al. .............. | 411/180 |
| 7,001,125 B2 | * | 2/2006 | Wojciechowski et al. ... | 411/180 |

FOREIGN PATENT DOCUMENTS

DE  19710246  9/1998
EP  0 561 715 A1  9/1993

* cited by examiner

*Primary Examiner*—Flemming Saether
(74) *Attorney, Agent, or Firm*—Trexler, Bushnell, Giangiorgi, Blackstone & Marr, Ltd

(57) ABSTRACT

A self-punching fastener (10), which in a way safe against rotation and pressing out can be pressed into a metal sheet member (40) having an annular body, the side of which facing the metal sheet is having radially disposed projections (15, 25), which, during the pressing-in, are pressed into the metal sheet member (40) and thereby are securing the fastener (10) against rotation, wherein in the centre an interior thread (11) is positioned and, wherein on the side facing the metal sheet member (40) in the set state there is provided an annular depression (12) into which the material displaced during the setting is pressed.

2 Claims, 3 Drawing Sheets

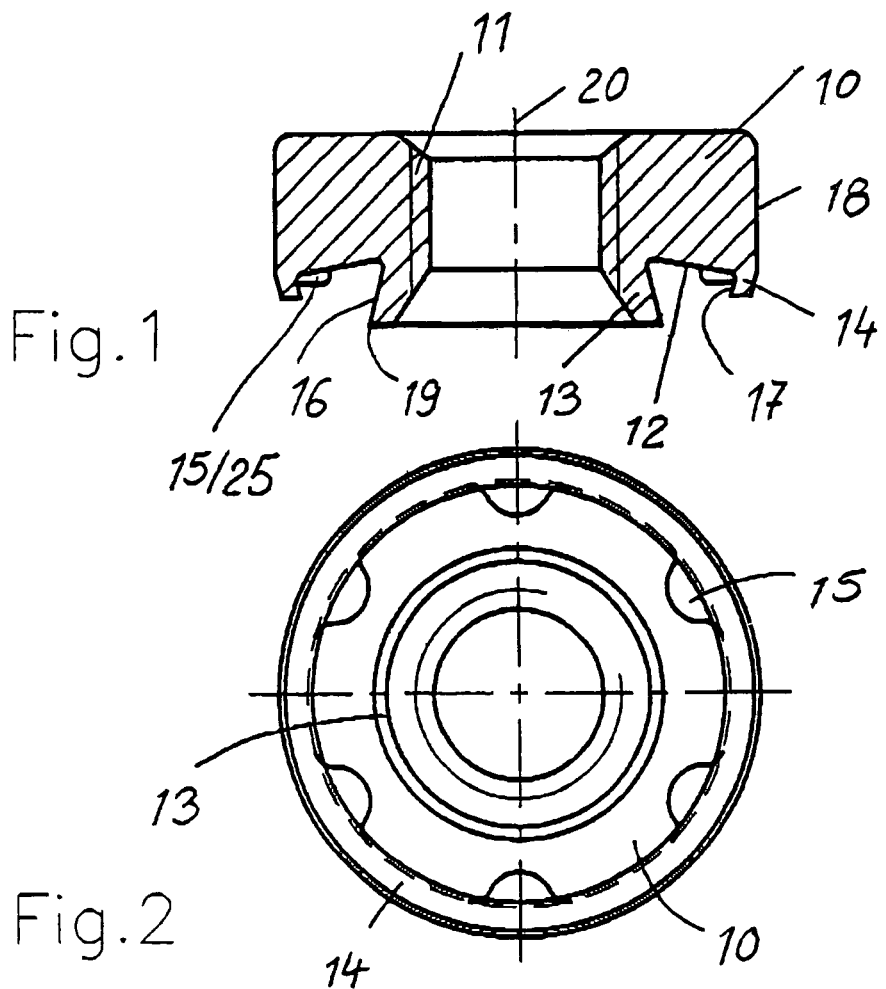
Fig. 1
Fig. 2
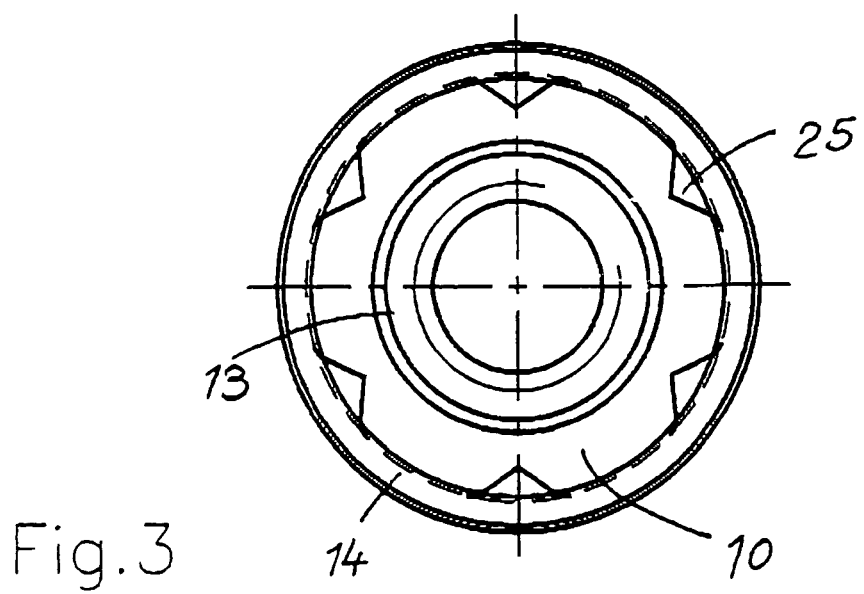
Fig. 3

SELF-PUNCHING FASTENER WITH RADIALLY POSITIONED PROJECTIONS AND AN ANNULAR DEPRESSION

RELATED/PRIORITY APPLICATIONS

This application is a National Phase filing of International Application No. PCT/DE02/03077, filed Aug. 22, 2002, which claims the benefit of German Application No. 20113853.0, filed Aug. 22, 2001.

BACKGROUND OF THE INVENTION

The present invention relates to a self-punching fastener, which in a way safe against rotation and pressing out can be pressed into a metal sheet having an annular body, the side of which facing the metal sheet is having radially positioned projections, which are pressed into the metal sheet into the surface thereof during the setting with an interior thread being positioned in the center thereof and which on the side of the annular body facing the metal sheet in the set state is having a surrounding annular depression into which the metal sheet material displaced during the setting is pressed.

It is the task to be solved by the present invention to improve such a fastener in such a way that with the same geometry in a maximal range of gauges of the metal sheet can be used with a high safety against rotation and pressing out without a previous punching or a special preparation of the holes into which the fastener is to be set being necessary.

According to the prior art, the known solutions were based on the assumption that an optimal safety against rotation and pressing out and a broad range of use of the fastener is achieved if for the locking against rotation continuous ridges are provided within the annular depression and if the bottom of the annular depression is parallel to the surface of the metal sheets to be worked.

SUMMARY OF THE INVENTION

Contrary to this, the present invention is based on the fact that for achieving an optimal safety against rotation burl-shaped locking elements are provided in a maximal distance to the central axis to make use of the most effective lever against the rotational momentum at the utmost supporting collar of the annular depression.

A further advantage of the solution according to the invention is consisting in the fact that by the above described displacing of the security against rotation and the inclined formation of the bottom of the annular depression at the innermost limit of the annular depression—the punching collar—there is more space for the penetration of the cutting ring of the punching die available, which means it is possible to work with larger thicknesses of the metal sheets or larger gauge ranges with the solution according to the invention.

The coordination between the punching die geometry and the shape of the annular depression and the kind of security against rotation according to the invention is ensuring that after the pressing-in of the metal sheet material a jamming on the punching die is prevented and therefore a high working safety is secured.

Into the undercuts formed during the production of the parts as well at the inner punching collar as on the supporting collar of the annular depression during the pressing-in of the parts the material of the metal sheet is shaped into said undercuts ensuring that even with the working in thin metal sheets a high safety against rotation and pressing out of the fastener is achieved.

The shape of the projections or burls can be arched as well as with sharp edges (triangular).

BRIEF DESCRIPTION OF THE DRAWINGS

FIG. 1 provides a cross-sectional view of a fastener which is in accordance with an embodiment of the present invention;

FIG. 2 provides a bottom view of the fastener shown in FIG. 1;

FIG. 3 is a bottom view similar to that of FIG. 2, but shows a bottom view where the fastener is in accordance with an alternative embodiment of the present invention;

Description

DETAILED DESCRIPTION OF THE INVENTION

Figure 4:
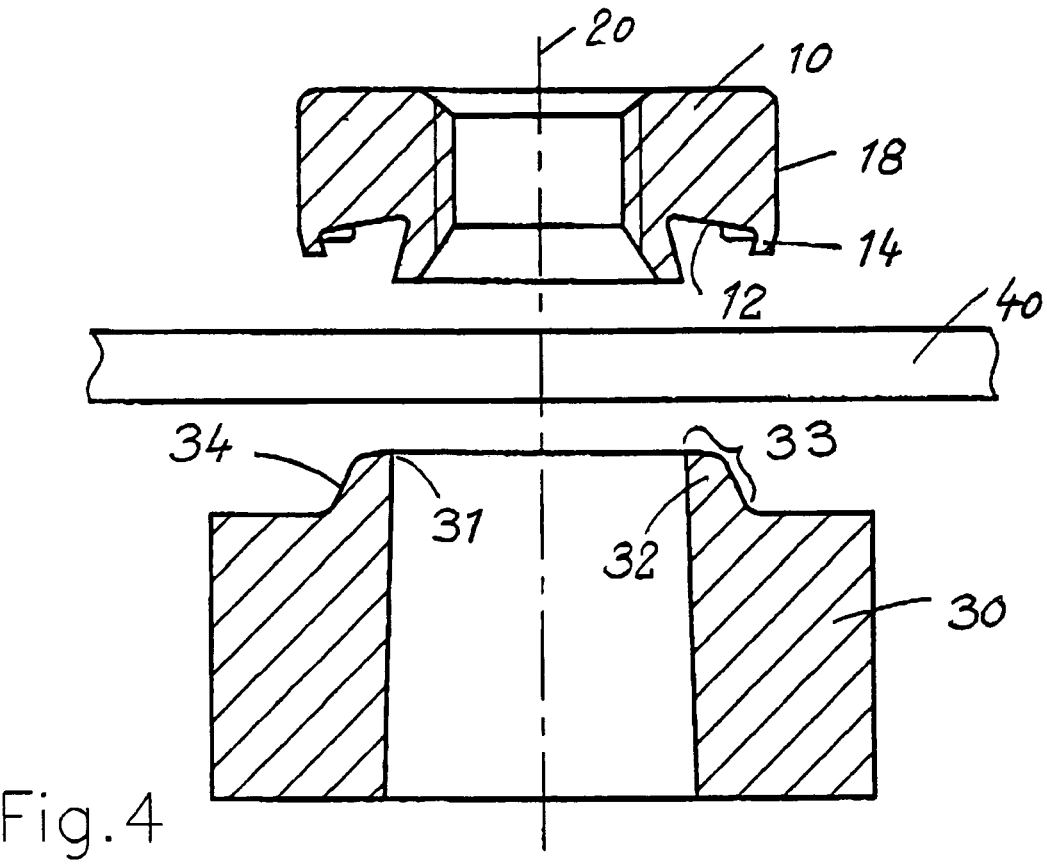
FIG. 4 shows the fastener as well as a punching die and a sheet member.

In the following, the invention is more detailly described with reference to the attached drawings.

FIG. 1 is showing a fastener according to the invention in the shape of a nut consisting of an annular basic body 10. In the center of the cylindrical fastener 10 there is through-bore which at least over a part of the height of the fastener 10 is formed as a thread 11.

On the bottom side, the fastener 10 according to the invention is provided with an annular depression 12, the bottom face of which starting from its inner limitation—the punching collar 13—is inclined to its outer limitation, i.e. the supporting collar 14. Within this annular depression 12 at the outer supporting collar 14 there are provided evenly distributed burl-shaped locking elements 15 in an annular array. The punching collar 13 is having an undercut 16 towards the axis 20 of the fastener 10 according to the invention and the supporting collar 14 is having an undercut 17 in the direction of the exterior enveloping face 18 of the fastener 10 according to the invention. The punching collar 13 is having a cutting edge 19.

FIG. 2 shows the fastener 10 according to the invention of FIG. 1 in a bottom view. The shape and the position of the burl-shaped locking elements 15 are clearly shown. The burl-shaped locking elements 15 are positioned at the outer supporting collar 14 and are forming a free-spaced towards the punching collar 13. In this representation (FIG. 2) the variant with annularly shaped burl-shaped locking elements 15 is shown.

FIG. 3 shows the fastener 10 according to the invention in an embodiment having sharp-edged (triangular) burl-shaped locking elements 25.

FIG. 4 shows the fastener 10 according to the invention in accordance to FIGS. 1, 2 and 3 as well as the punching die 30 and the metal sheet member 40. From this representation it can be learned that the metal sheet member 40 does not have a prefabricated hole and does not need any further preparation. The punching die 30 is having a cutting edge 31 and a swaging ring 32 having a special geometry 33. The exterior enveloping face 34 of the swaging ring 32 is running conically towards the central axis 20 of the punching die 30. This is ensuring that after the punching and pressing-in of the metal sheet member 40 into the annular depression 12 a jamming of the swaging ring 32 in the metal sheet member 40 is avoided.

Figure 5:
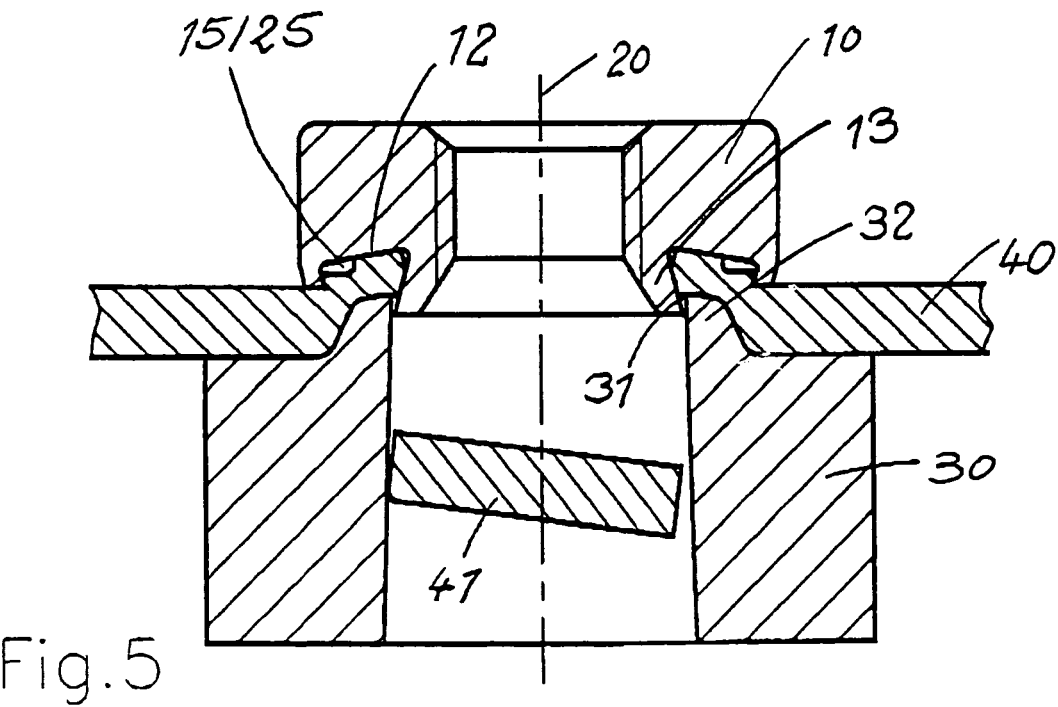
FIG. 5 shows the fastener shortly after a setting process.

FIG. 5 shows the fastener 10 according to the invention of FIGS. 1 to 3 shortly after the finalization of the setting procedure. By the punching collar 13 in corporation with the cutting edge 31 of the punching die 30, a disk 41 has been punched out of the metal sheet member 40 and the material of the metal sheet member 40 has been swaged into the annular depression 12 by the swaging ring 32 enclosing the burl-shaped locking elements 15, 25. The stemmed out disk 41 is discarded downwardly from the punching die 30.

Figure 6:
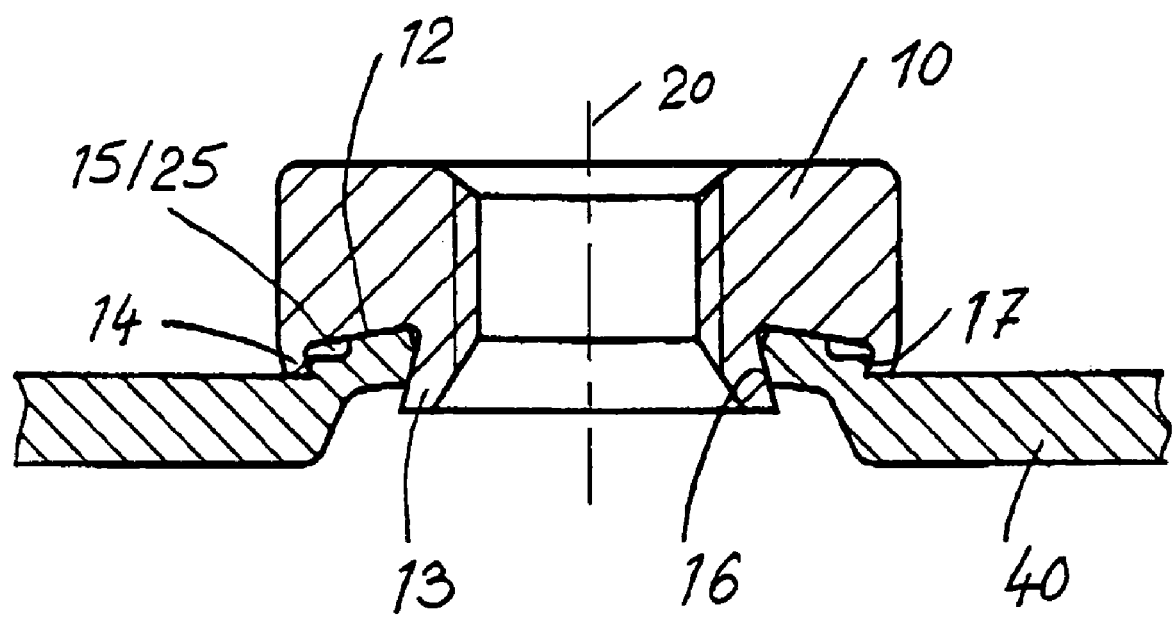
FIG. 6 shows the fastener completely set in the metal sheet member.

FIG. 6 is showing the fastener 10 according to the invention completely set in a metal sheet member 40. The action of the undercut 16, 17 at the punching collar 13 and at the supporting collar 14 is clearly shown. The annular depression 12 is filled with the material of the metal sheet member 40. The burl-shaped locking elements 14, 25 are embedded in the metal sheet member 40. The positive action of the bottom face of the annular depression 12 inclined to the exterior for enlarging the active length of the punching collar 13 and therefore for increasing the range of useable gauge ranges of the metal sheets for the fastener 10 according to the invention can be clearly noticed.

The invention claimed is:

1. Self-punching fastener (10), which in a way safe against rotation and pressing out can be pressed into a metal sheet (40) having a body, which, on the side facing the metal sheet, is having radially positioned projections (15, 25), which during the pressing-in are pressed into the metal sheet member (40) and thereby are securing the fastener (10) against rotation, wherein in the center there is positioned an interior thread (11) and, wherein on the side facing the metal sheet member (40) in the set state there is provided an annular depression (12), wherein the projections (15, 25) are positioned in said depression (12) equally distributed, characterized in that the projections (15, 25) are positioned interiorly of a collar (14) between the collar (14) and the thread (11) and, in that said collar includes an undercut (17) in the direction of the depression (12) to be able to receive metal sheet material for locking against an axial pressing out, the body and the depression (12) being annularly designed, wherein proximate an end of the annular depression (12) on the side facing the metal sheet member (40) is a punching collar (13) which is designed such that it is punching a hole with its diameter in the metal sheet member (40) during the setting of the fastener (10), with the punching collar (13) in the direction of the depression (12) is having an undercut (16) receiving metal sheet material occurring during the pressing-in to ensure a further locking of the fastener (10) against an axial pressing out, wherein the projections (15, 25) are provided as starting at the undercut (17) of the collar (14) and extending radially inward toward the punching collar (13) by terminating before the punching collar (13), thereby providing a gap between each of the projections and the punching collar (13) along the depression (12), and the bottom face of the annular depression (12) is inclined from the interior to the exterior in the direction of the metal sheet member (40) wherein the projections have a height which increases in a direction from the undercut (17) of the collar (14) to the punching collar (13), wherein the height of the projections is the greatest proximate the gap.

2. Fastener (10) according to claim 1, characterized in that the punching collar (13) with respect to its height is adapted to the gauge of the respective metal sheet member (40) to be punched.

* * * * *